United States Patent
Imachi et al.

(10) Patent No.: US 7,402,360 B2
(45) Date of Patent: Jul. 22, 2008

(54) NON-AQUEOUS ELECTROLYTE BATTERY

(75) Inventors: Naoki Imachi, Kobe (JP); Seiji Yoshimura, Kobe (JP); Shin Fujitani, Kobe (JP)

(73) Assignee: Sanyo Electric Co., Ltd., Osaka (JP)

(*) Notice: Subject to any disclaimer, the term of this patent is extended or adjusted under 35 U.S.C. 154(b) by 709 days.

(21) Appl. No.: 10/809,875

(22) Filed: Mar. 26, 2004

(65) Prior Publication Data

US 2004/0191611 A1    Sep. 30, 2004

(30) Foreign Application Priority Data

Mar. 28, 2003  (JP)  ............................. 2003-092311
Mar. 28, 2003  (JP)  ............................. 2003-092312

(51) Int. Cl.
  H01M 4/58   (2006.01)
  H01M 4/00   (2006.01)
  H01M 4/50   (2006.01)
  H01M 2/16   (2006.01)

(52) U.S. Cl. ................ 429/231.1; 429/231.3; 429/224; 429/223; 429/249; 429/247; 429/253

(58) Field of Classification Search ............. 429/231.1, 429/224, 223, 247, 231.3, 249, 253
See application file for complete search history.

(56) References Cited

U.S. PATENT DOCUMENTS 6,127,438 A   10/2000  Hasegawa et al. ............. 521/64
6,482,550 B1  11/2002  Imachi et al. ................ 429/338

FOREIGN PATENT DOCUMENTS

| JP | 63-205048 A | 8/1988 |
| JP | 5-74443 A | 3/1993 |
| JP | 10-112305 A | 4/1998 |
| JP | 2000-215884 A | 8/2000 |
| JP | 2000-260423 A | 9/2000 |
| JP | 2001-015108 A | 1/2001 |
| JP | 2002-025526 A * | 1/2002 |
| JP | 2002-246000 A | 8/2002 |
| JP | 2002-251996 A | 9/2002 |
| JP | 2002-284918 A | 10/2002 |
| JP | 2002-321323 A | 11/2002 |
| WO | 96/27633 A1 | 9/1996 |
| WO | 00/20492 | 4/2000 |

* cited by examiner

*Primary Examiner*—Laura S Weiner
(74) *Attorney, Agent, or Firm*—Kubovcik & Kubovcik

(57) ABSTRACT

The invention provides a non-aqueous electrolyte battery characterized in that: an active material of the positive electrode includes lithium manganese oxide; the shut-down temperature of the separator is 162° C. or lower; and the area contraction ratio of the separator at 120° C. is 15% or less.

9 Claims, 6 Drawing Sheets

NON-AQUEOUS ELECTROLYTE BATTERY

BACKGROUND OF THE INVENTION

1. Field of the Invention

The present invention relates to a non-aqueous electrolyte battery.

2. Description of the Related Art

In recent years, the use of non-aqueous electrolyte batteries such as lithium ion batteries which are compact, light, and have high energy density, has been increasing rapidly as power sources for portable electric apparatuses and the like. In such non-aqueous electrolyte batteries, lithium cobalt oxide is generally used as an active material of the positive electrode and an organic solvent is used as the solvent for the electrolyte solution. As a result, there is a possibility of an abnormality occurring in non-aqueous electrolyte batteries, for example, where the temperature inside the battery suddenly increases due to an increase in the temperature of the environment in which the battery is utilized, or due to overcharging of the battery. Accordingly, a variety of techniques have been examined in the conventional non-aqueous electrolyte batteries in order to enhance the safety of the batteries.

For example, a non-aqueous electrolyte battery having a safety mechanism that utilizes a shut-down function of a separator that separates the positive electrode from the negative electrode has been proposed as means for increasing the safety of the non-aqueous electrolyte battery. According to this shut-down function, the separator made of polypropylene or polyethylene, thermally contracts due to the melting point of polypropylene or polyethylene in the case where heat is generated inside the battery as a result of the abnormality. Such a thermal contraction makes microscopic pores, which are created in the separator and enable ion migration, close, so that the current is blocked, preventing it from flowing between the positive and negative electrodes.

It is desirable to block the current as soon as possible in order to enhance the safety of the battery in the case where heat is generated as a result of the abnormality. Thus, it is desirable to set the shut-down temperature of the separator at a temperature as low as possible. Here, in the present specification, the shut-down temperature of the separator indicates the temperature when the current between the positive and negative electrodes is completely blocked after the closure of microscopic pores, which are created in the separator for ion migration. Thus, the separator is formed of a combination of materials, wherein the ratio of polyethylene, having a melting point lower than that of polypropylene, has been increased in order to set the shut-down temperature of the separator at a low level.

However, when heat is applied, polyethylene has a low dimensional stability in comparison with polypropylene and, therefore, the above described separator has a low dimensional stability when heat is applied, and as a result, a large thermal contraction occurs in the case when the temperature of the battery increases, so as to create a gap inside the battery short circuiting the positive and negative electrodes via this gap. Thus, the battery is disadvantaged due to its diminished safety.

In addition, there is a problem when polyethylene has a lower film-breaking temperature than polypropylene. As a result, there is a case where the positive and negative electrodes short circuit when the separator breaks immediately after the operation of the shut-down function of the separator. Thus, the battery is disadvantaged due to its diminished safety. Here, in the present specification, the film-breaking temperature indicates the temperature where the separator contracts and breaks due to heat, causing the positive and negative electrodes to short circuit.

Thus, in order to eliminate the above described disadvantages, a non-aqueous electrolyte battery, having an insulating plate that fuses with the separator inside the battery, has been proposed for the purpose of preventing the short circuiting due to the contact made by the positive and negative electrodes which have been exposed as a result of the contraction of the separator (for example, Japanese Unexamined Patent Publication No. 5(1993)-74443).

In the non-aqueous electrolyte battery described in the above prior art, however, both ends of the separator are fused with the insulating plate and, therefore, the separator cannot be prevented from breaking due to the contraction of the separator, and in effect, a disadvantage is created when the battery short circuits.

SUMMARY OF THE INVENTION

An object of the present invention is to provide a non-aqueous electrolyte battery with enhanced safety which can be used in the case when the temperature inside the battery increases due to a rise in the temperature of the environment in which the battery is utilized, or due to overcharging of the battery.

The first aspect of the present invention provides a non-aqueous electrolyte battery having a positive electrode, a negative electrode, non-aqueous electrolyte and a separator, characterized in that an active material of the positive electrode includes lithium manganese oxide and the shut-down temperature of the above described separator is 162° C. or lower, and the area contraction ratio of the above described separator at 120° C. is 15% or lower.

In the non-aqueous electrolyte battery according to the first aspect of the present invention, the area contraction ratio at 120° C. is 15% or lower, and therefore, it becomes possible to prevent the occurrence of short circuiting between the positive and negative electrodes due to the contraction of the separator, even in the case where a sudden rise in temperature occurs after the shut-down function of the separator takes place at the time of, for example, overcharging of the battery. In addition, in the case where the battery of the present invention is a non-aqueous electrolyte battery with spiral electrodes in which the positive and negative electrodes as well as the separator are wound, it becomes possible to prevent the separator, in a taut state due to winding, from contracting and being broken.

Here, the area contraction ratio is (the area of the separator at room temperature−the area of the separator at the measured temperature)/the area of the separator at room temperature× 100(%).

In addition, though the area contraction ratio at 120° C. is 15% or lower in the non-aqueous electrolyte battery according to the first aspect of the present invention, the smaller the area contraction ratio the more preferable. The separator made of polypropylene or polyethylene thermally contracts so that microscopic pores for electrical conduction are closed, and the shut-down function of the separator takes place, and therefore, there is a possibility of the shut-down function not being completed when a separator having an area contraction ratio at 120° C. smaller than approximately 1% is used.

In addition, the shut-down temperature of the separator is 162° C. or lower in the non-aqueous electrolyte battery according to the first aspect of the present invention, and therefore, the shut-down function takes place before an abnormal rise in the temperature occurs inside the battery due to heat generated on the positive electrode.

Here, it is preferable for the shut-down temperature to be 100° C. or higher in order to ensure that the battery can be utilized in a normal condition, taking the temperature of the environment in which the battery is utilized into consideration.

According to the first aspect of the present invention, a sudden rise in the temperature inside the battery can be suppressed, and the contraction of the separator can be avoided, so that the safety of the battery can be enhanced.

The second aspect of the present invention provides a non-aqueous electrolyte battery having a positive electrode, a negative electrode, non-aqueous electrolyte and a separator, characterized in that an active material of the positive electrode includes lithium manganese oxide and the shut-down temperature of the above described separator is 162° C. or lower, and the difference between the film-breaking temperature and the shut-down temperature is 20° C. or higher at the time when the temperature rises at 15° C./min. (here, the film-breaking temperature>the shut-down temperature).

In the non-aqueous electrolyte battery according to the second aspect of the present invention, a separator is used where the difference between the film-breaking temperature and the shut-down temperature is 20° C. or higher at the time when the temperature rises at 15° C./min. As a result, it becomes possible to prevent the occurrence of short circuiting between the positive and negative electrodes due to the film-breaking of the separator even in the case where the temperature suddenly rises after the shut-down function of the separator takes place at the time of, for example, overcharging of the battery. In addition, in the case where the battery of the present invention is a non-aqueous electrolyte battery with spiral electrodes in which the positive and negative electrodes as well as the separator are wound, it becomes possible to prevent the separator, in a taut state due to winding, from being broken.

Here, the film-breaking temperature according to the second aspect of the present invention indicates the temperature where the separator contracts and breaks due to heat so that the short circuiting occurs between the positive and negative electrodes.

In addition, though the difference between the film-breaking temperature and the shut-down temperature is 20° C. or higher at the time when the temperature rises at 15° C./min in the non-aqueous electrolyte battery according to the second aspect of the present invention, the greater the temperature difference, the more preferable.

Here, as described above, the shut-down temperature of the separator is set at 162° C. or lower in the non-aqueous electrolyte battery according to the second aspect of the present invention and, therefore, the shut-down function takes place before an abnormal temperature rise occurs inside the battery due to heat generated on the positive electrode.

Here, it is preferable for the shut-down temperature to be 100° C. or higher in order to ensure that the battery can be utilized in the normal condition, taking the temperature of the environment where the battery is utilized.

According to the second aspect of the present invention, a sudden rise in the temperature inside the battery can be restricted and the film-breaking of the separator can be avoided, and thereby, the safety of the battery can be enhanced.

In the following, the first and second aspects of the present invention are described as the "present invention".

In the non-aqueous electrolyte battery according to the present invention, an active material of the positive electrode includes lithium manganese oxide and lithium depositing on the surface of the negative electrodes can be restricted at the time of, for example, overcharging of the battery. This is because lithium manganese oxide releases lithium from the crystal at the time of normal charging, and therefore almost no lithium is extracted from the positive electrode at the time of overcharging of the battery. As a result, deposit lithium can be prevented from responding to the electrolyte solution and generating heat at the time of overcharging of the battery and the separator can be prevented from contracting due to a sudden rise in the temperature inside the battery.

In the non-aqueous electrolyte battery according to the present invention, an active material of the positive electrode includes lithium manganese oxide and, therefore, the thermal stability of the positive electrode in the charged condition (highly oxidized condition) can be enhanced. This is because lithium manganese oxide from which lithium has been extracted as a result of battery charging forms a quadrivalent stable compound. As a result, a sudden rise in the temperature of the battery caused by heat generated by the positive electrode or caused by the reaction between the positive electrode and the electrolyte solution can be prevented at the time of, for example, overcharging of the battery, and thus the contraction of the separator can be prevented.

In the non-aqueous electrolyte battery of the present invention, an active material of the positive electrode includes lithium manganese oxide and, thereby, lithium depositing on the surface of the negative electrode is restricted, and the thermal stability of the positive electrode in a highly oxidized condition can be maintained so as to prevent a sudden rise in the temperature of the battery. As a result, the stability of the battery can be enhanced.

In addition, it is preferable for the non-aqueous electrolyte battery of the present invention to have an active material of the positive electrode that is made of a mixture of lithium manganese oxide and lithium cobalt oxide or a mixture of lithium manganese oxide and a lithium-nickel complex oxide. Lithium cobalt oxide and a lithium-nickel complex oxide have a large capacity of occlusion and releasing of lithium in comparison with lithium manganese oxide. Lithium cobalt oxide and a lithium-nickel complex oxide, however, allow a large amount of lithium deposit on the surface of the negative electrode due to overcharging of the battery or the like and have a low thermal stability in comparison with lithium manganese oxide. As a result, it becomes easy for a sudden rise in the temperature inside the battery to occur in the case where an active material of the positive electrode includes lithium cobalt oxide and, thereby, the contraction of the separator becomes easy to occur and, therefore, it becomes necessary to limit the content of lithium cobalt oxide.

According to the present invention, a sudden rise in the temperature inside the battery can be restricted even in the case where an active material of the positive electrode includes lithium manganese oxide and an active material of the positive electrode includes lithium cobalt oxide or lithium-nickel complex oxide.

In addition, in the non-aqueous electrolyte battery of the present invention, the safety of the battery can be significantly enhanced when a separator of which the area contraction ratio is 15% or lower at 120° C. is used in the case where the ratio of lithium cobalt oxide or the lithium-nickel complex oxide is 10 wt. % to 90 wt. % in the active material of the positive electrode in comparison with the case where a separator of which the area contraction ratio is greater than 15% at 120° C. is used.

In addition, it is preferable for the non-aqueous electrolyte battery of the present invention to have a capacity of 1500 mAh or higher. Heat dissipation is in general, low and, therefore, the temperature inside the battery easily rises in a battery having a high capacity of 1500 mAh or higher in comparison with a battery having a capacity lower than that. Accordingly, a battery having a capacity of 1500 mAh or higher is formed in the same manner as in the present invention while lithium manganese oxide is used as an active material of the positive electrode so that a sudden rise in the temperature inside the battery can be restricted and in addition, a separator having a small area contraction ratio at the time of a high temperature is used and, thereby, the contraction of the separator can be prevented. Accordingly, the safety of the battery can be enhanced in the case where the temperature inside the battery rises due to a rise in the temperature of the environment in which the battery is utilized or due to overcharging of the battery.

Here, though a unit cell to which no protection circuits are connected is examined in the following experiments, batteries where the conditions are satisfied concerning the safety mechanism of the battery such as a protection circuit or a safety valve are in general delivered at the time when non-aqueous electrolyte batteries enter the market.

DETAILED DESCRIPTION OF THE PREFERRED EMBODIMENTS

Figure 1:
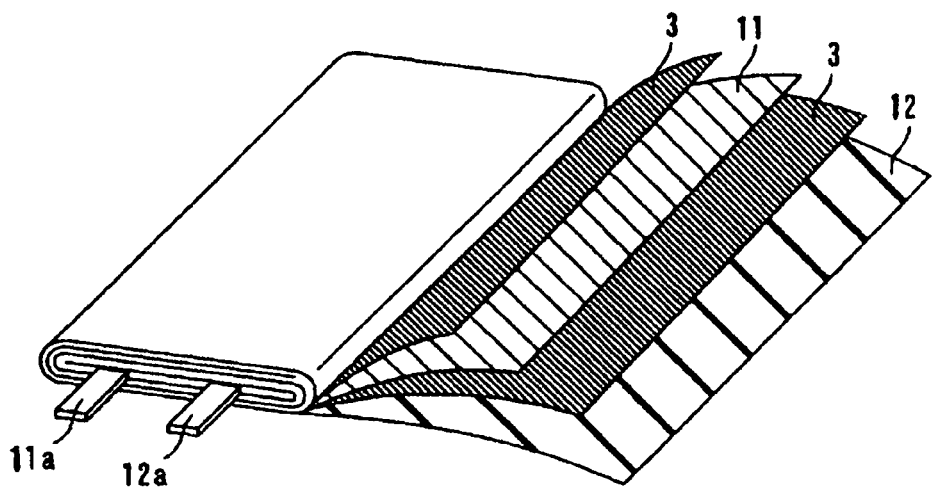
FIG. 1 is a perspective view showing the configuration of non-aqueous electrolyte battery used in the experiments of the present invention.

In the following, the embodiments of the present invention are described in detail. Here, overcharging tests are carried out without connecting protection circuits to tested batteries in the following experiments. In addition, functions concerning the enhancement of the battery safety other than the shut-down function of the separator are removed when tested batteries to which protection circuits are not connected are examined. Concretely speaking, no additives to the electrolyte solution, no additives to the positive electrode, no additives to the negative electrode or no safety valves are utilized in the following experiments.

Experiment 1

In experiment 1, lithium cobalt oxide is used as the active material of the positive electrode and the thermal stability of the active material of the positive electrode is examined.

$LiCoO_2$ that has been charged up to 4.3V and 4.5V using Li metal as the reference electrode is washed with diethyl carbonate and after that, vacuum drying is carried out for 30 minutes. 3 mg of this mixture for the positive electrode and 2 mg of ethylene carbonate are mixed with each other and sealed in an aluminum foil so that the temperature where the positive electrode starts generating heat is measured by using a DSC unit at a rate of temperature rising of 5° C./min.

As a result, it is found that heat generation starts at 202° C. in $LiCoO_2$ that has been charged up to 4. 3V and heat generation starts at 162° C. in $LiCoO_2$ that has been charged up to 4.5V.

Lithium cobalt oxide that has been measured herein has a low thermal safety in comparison with lithium manganese oxide. Accordingly, the temperature where the heat generation in the positive electrode starts is considered to be higher than 162° C. in the case wherein a measurement is carried out as described above on an active material of the positive electrode that is made of a mixture of lithium cobalt oxide and lithium manganese oxide or a mixture of a lithium-nickel complex oxide and lithium manganese oxide and that has been charged up to 4.5 V.

Accordingly, the shut-down function must take place at 162° C. or lower where the thermal stability of the charged positive electrode can be secured in the separator utilized in the present invention. In the case wherein a separator where the shut-down temperature of the separator is higher than 162° C. is utilized even when the area contraction ratio of the separator at 120° C. is 15% or lower, there is a possibility of an abnormal rise in the temperature inside the battery due to the heat degeneration of the positive electrode before the shut-down function takes place.

Experiment 2

In experiment 2, a separator having a different area contraction ratio at 120° C. is used to examine the interrelationship between the area contraction ratio of the separator and the level of overcharging of the battery.

[Manufacture of Positive Electrode]

Lithium cobalt oxide ($LiCoO_2$) and lithium manganese oxide ($LiMn_2O_4$) were mixed so that 80 wt. % of lithium cobalt oxide was included and, thereby, the active material of the positive electrode was prepared. This active material of the positive electrode, carbon conductive agent (artificial graphite SP300) and graphite (acetylene black) were mixed according to a weight ratio of 92:3:2 and, thereby, the powder mixture of the positive electrode was prepared. 200 g of this powder mixture of the positive electrode was filled into a mixing unit (Mechano fusion unit (AM-15F) made by Hosokawa Micron Corporation) and after that, the mixing unit was operated for ten minutes at a revolution of 1500 rpm so that mixture was carried out due to compression, impact and shearing effects so as to gain a mixture that was an active material of the positive electrode. Next, a fluorine included resin bounding agent (PVDF (polyvinylidene fluoride)) was added to the mixture that was the active material of the positive electrode so that the weight ratio of the mixture that was the active material of the positive electrode to the fluorine included resin bounding agent became 97:3 and after that, this mixture was kneaded in an NMP solvent (N-methyl-2-pyrolidone) so as to gain a mixture of slurry of the positive electrode. This mixture of slurry of the positive electrode was applied to both surfaces of an aluminum foil and was dried and after that, the aluminum foil was rolled so that a positive electrode in plate form was prepared.

[Manufacture of Negative Electrode]

A mixture gained by mixing a carbon material (graphite) which is an active material of the negative electrode with SBR (styrene-butadiene rubber) which is a bonding agent according to a weight ratio of 98:2 was applied to both surfaces of a copper foil and was dried, and after that, the copper foil was rolled to prepare a negative electrode in plate form.

[Preparation of Electrolyte Solution]

$LiPF_6$ which is a solute was dissolved in a solvent, gained by mixing ethylene carbonate with diethyl carbonate according to a volume ratio of 3:7, at a rate of 1.0 mol/l and, thereby, an electrolyte solution was prepared.

[Manufacture of Non-aqueous Electrolyte Battery]

FIG. 1 is a perspective view showing the configuration of a non-aqueous electrolyte battery that has been utilized in Experiment 2. The positive electrode, the negative electrode, the electrolyte solution and the separators that had been gained in the above were used so that lead terminals were attached to a positive electrode 11 and a negative electrode 12, respectively, and a separator 3 was placed between the positive and negative electrodes. Furthermore, another separator was placed on the positive electrode and after that the positive electrode was wound in spiral form. This winding in spiral form was placed in the exterior body of the battery made of aluminum laminate and after that, the electrolyte solution was injected and the exterior body of the battery was sealed so that a thin non-aqueous electrolyte battery, such as thin non-aqueous electrolyte batteries a8, b8, c8, d8, x8 or y8 (of which the capacity is 700 mAh), was manufactured as shown in Table 1.

[Measurement of Area Contraction Ratio of Separator]

A separator A of 20 mm×30 mm (of which the thickness is 15 μm, the porous ratio is 42% and the shutdown temperature is 148° C.) and a separator X (of which the thickness is 15 μm, the porous ratio is 40% and the shut-down temperature is 135° C.) are prepared respectively and both ends of each separator are secured to a grass plate with a heat resistant imide tape and then, the separator was left for 30 minutes in a thermobath at 120° C. and after that, the separator is gradually cooled at room temperature so that the area α mm² of the separator after cooling was measured. The results of the calculaLion of the area contraction ratio (%) =(20×30−α) mm²/(20×30) mm² of each separator at 120° C. are shown in Table 1.

[Overcharging Tests]

Each of the batteries that had been manufactured was discharged down to 2.75V with a predetermined discharge current (constant current). After that, each battery was charged to 12V with a predetermined charge current (constant current) and then, was overcharged using a circuit for allowing charge at a constant voltage and this process was continued until 3 hours had passed since the point of time when the current was cut off for the first time. Then, the existence of short circuiting was confirmed. The examination was carried out with overcharging current of 1 C (650 mA) to 5 C (3250 mA). Thus, the maximum current value that does not cause short circuiting was gained for each battery and this result is shown in Table 1 as a level of over charging of the battery. Here, this overcharging test is carried out in the condition where no protection terminals or no protection elements are attached to the tested batteries.

TABLE 1

|  | Separator | | | | | |
|---|---|---|---|---|---|---|
|  | A | B | C | D | X | Y |
| Area Contraction Ratio/% at 120° C. | 11 | 15 | 6 | 3 | 30 | 22 |
| Level of Overcharging of Battery | 4.2 C (Battery a8) | 4.1 C (Battery b8) | 4.2 C (Battery c8) | 4.0 C (Battery d8) | 2.0 C (Battery x8) | 2.2 C (Battery y8) |

As is clear from Table 1, it is found that the levels of overcharging of batteries a8, b8, c8 and d8 have been increased in comparison with batteries x8 and y8.

Accordingly, it is found that when the area contraction ratio of the separator at 120° C. is 15% or less, the separator contracts so as to generate a gap inside the battery and short circuiting between the positive and negative electrodes can be prevented from occurring via this gap even in the case where a sudden rise in the temperature occurs after the shut-down function of the separator takes place at the time of overcharging of the battery. In particular, in the case of a non-aqueous electrolyte battery where the positive and negative electrodes as well as the separators are tightly maintained as flat wound electrodes, it is considered that even the separator in a taut state due to winding can be restricted from being broken because of the contraction.

As a result of the above described preparatory experiments, Experiment 1 and Experiment 2, in a non-aqueous electrolyte battery having a positive electrode, a negative electrode, non-aqueous electrolyte and a separator, it is necessary for an active material of the positive electrode to include lithium manganese oxide; it is necessary for the shut-down temperature of the separator to be 162° C. or lower; and it is necessary for the area contraction ratio at 120° C. to be 15% or less.

Experiment 3

In Experiment 3, separators A and X were used to examine the interrelationship between the ratio of lithium cobalt oxide in the active material of the positive electrode, which were varied, and the level of overcharging of the material.

Figure 2:
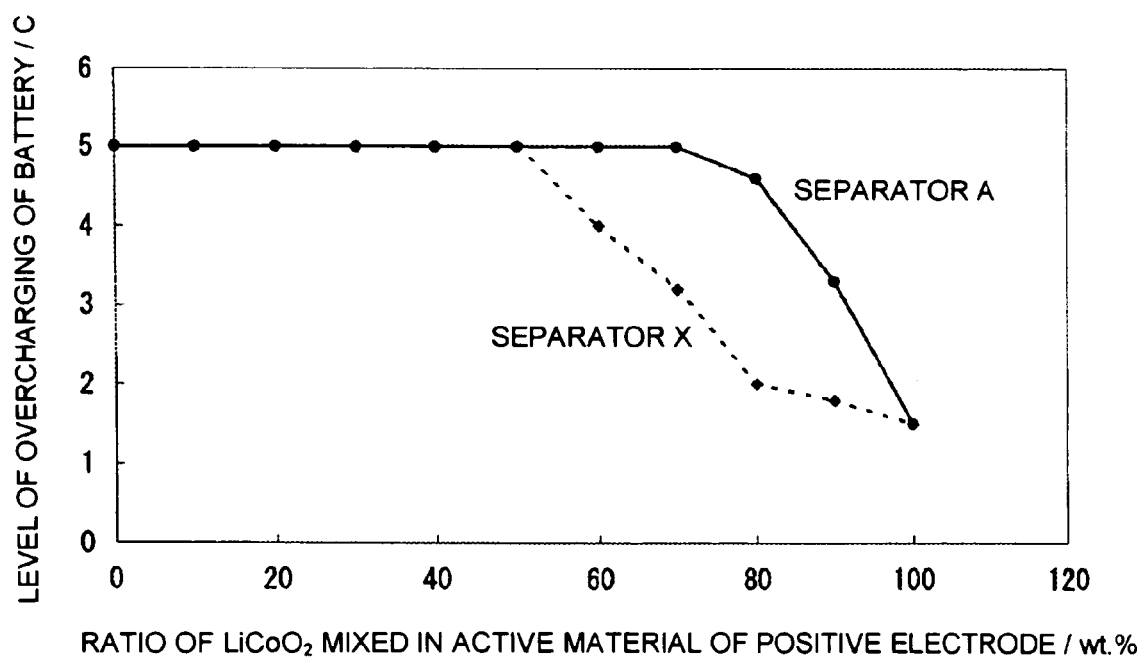
FIG. 2 is a graph showing the interrelationship between the wt. % of lithium cobalt oxide in the active material of the positive electrode and the level of overcharging in a battery of a 700 mAh class.

Lithium cobalt oxide ($LiCoO_2$) and lithium manganese oxide ($LiMn_2O_4$) were mixed so that the ratio of lithium cobalt oxide became 0 wt. %, 10 wt. %, 20 wt. %, 30 wt. %, 40 wt. %, 50 wt. %, 60 wt. %, 70 wt. % , 80 wt. %, 90 wt. % and 100 wt. % and, thereby, eleven types of active materials of the positive electrode having different ratios of mixture were prepared while separators A and X were used so that batteries a0 to a10 as well as x0 to x10 were fabricated as shown in Table 2. Thus, an overcharging test was carried out with the other conditions being the same manner as in Experiment 2. The interrelationship between the area contraction ratio at 120° C. and the level of overcharging of the battery is shown in FIG. 2 and Table 2. FIG. 2 is a graph showing the interrelationship between the wt. % of lithium cobalt oxide in the active material of the positive electrode and the level of overcharging of the battery.

TABLE 2

| Ratio of Lithium Cobalt Oxide Mixed in Active Material of Positive | Level of Overcharging of Battery | |
|---|---|---|
| Electrode (wt. %) | Separator A | Separator X |
| 0 | 5.0 C (Battery a0) | 5.0 C (Battery x0) |
| 10 | 5.0 C (Battery a1) | 5.0 C (Battery x1) |
| 20 | 5.0 C (Battery a2) | 5.0 C (Battery x2) |
| 30 | 5.0 C (Battery a3) | 5.0 C (Battery x3) |
| 40 | 5.0 C (Battery a4) | 5.0 C (Battery x4) |
| 50 | 5.0 C (Battery a5) | 5.0 C (Battery x5) |
| 60 | 5.0 C (Battery a6) | 4.0 C (Battery x6) |
| 70 | 5.0 C (Battery a7) | 3.2 C (Battery x7) |
| 80 | 4.6 C (Battery a8) | 2.0 C (Battery x8) |
| 90 | 3.3 C (Battery a9) | 1.8 C (Battery x9) |
| 100 | 1.5 C (Battery a10) | 1.5 C (Battery x10) |

As is clear from FIG. 2 and Table 2, it is found that the level of overcharging of a battery a8 (of which the level of overcharging is 4.6 C) has been increased in comparison with a battery x8 (of which the level of overcharging is 2.0 C) in the case wherein an active material of the positive electrode in which 80 wt. % of lithium cobalt oxide has been mixed is utilized.

Figure 3:
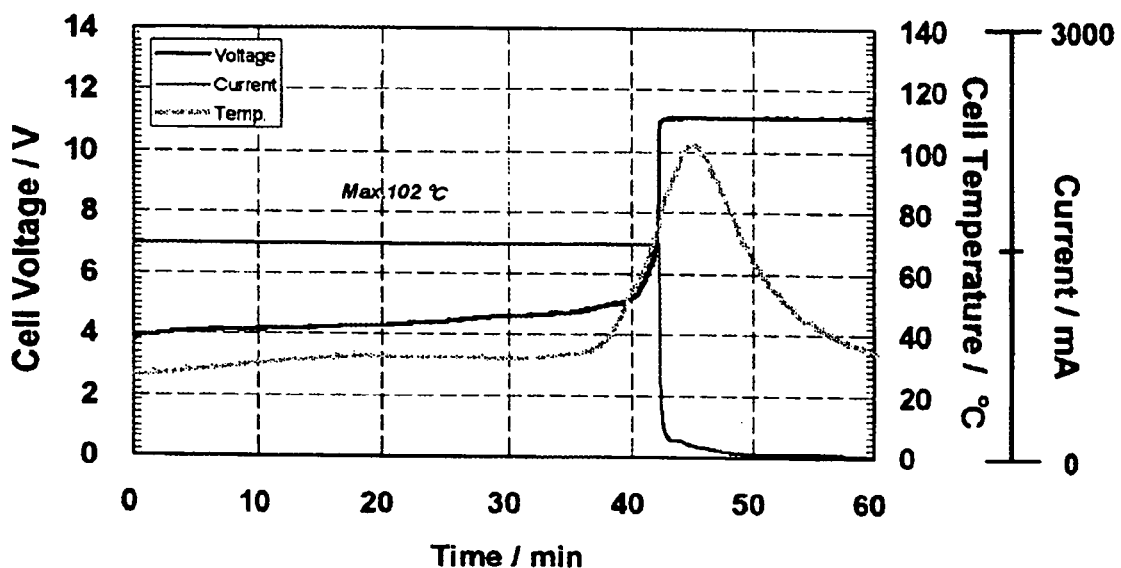
FIG. 3 is a graph showing the overcharging characteristics of a battery a8.
Figure 4:
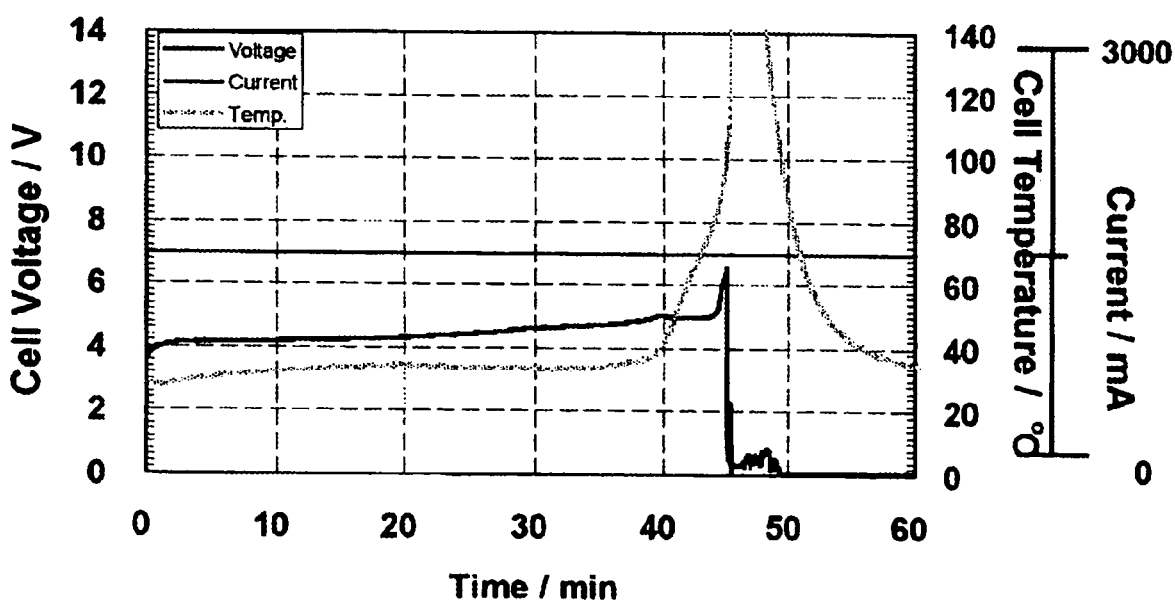
FIG. 4 is a graph showing the overcharging characteristics of a battery x8.

In order to understand the reason why the level of overcharging of the battery has increased, the graph of FIG. 3 shows the overcharging characteristics of the battery a8 while the graph of FIG. 4 shows the overcharging characteristics of the battery x8 at the time when tests are carried out with a current value of 2 C.

The battery a8 includes lithium manganese oxide in an active material of the positive electrode and, thereby, lithium depositing on the surface of the negative electrode is restricted and in addition, the thermal stability of the positive electrode is maintained in a highly oxidized condition and, thereby, a sudden rise in temperature of the battery is prevented. Furthermore, it is considered that the separator A is utilized in order to prevent the contraction of the separator A while the shut-down function is taking place. In particular, the battery a8 has a structure where the positive electrode, the negative electrode and the separator are firmly held in the form of flat wound electrodes and, therefore, the separator can be prevented from breaking due to the contraction because of the area contraction ratio of the separator at 120° C. being 15% or less even in the case wherein the separator is in a taut state due to winding.

On the other hand, it is considered that a thermal contraction of the separator X has occurred while the shut-down function of the separator X is taking place and, thereby, short circuiting between the positive and negative electrodes has occurred in the battery x8 though a sudden rise in temperature is prevented as a result of the existence of lithium manganese oxide in an active material of the positive electrode.

In addition, the ratio of lithium cobalt oxide mixed in the active material of the positive electrode should be noted. In the case of the utilization of an active material of the positive electrode in which lithium cobalt oxide in a range of from 60 wt. % to 90 wt. % is mixed, it is found that the levels of overcharging of batteries a6 to a9, respectively, which utilize the separator A, have increased in comparison with batteries x6 to x9 that utilize the active materials of the positive electrode having the same ratios of mixture and that uses the separator X.

Here, the levels of overcharging of batteries a10 and x10, where the active materials of the positive electrode are solely made of lithium cobalt oxide, are both 1.5 C and thus, an increase in the level of overcharging of the battery by using the separator A was not recognized.

This is because the batteries a10 and x10 do not include lithium manganese oxide in the active materials of the positive electrode and, therefore, lithium easily deposits on the surface of the negative electrodes and the positive electrodes in a highly oxidized condition easily become thermally unstable. As a result, it is considered that a sudden rise in temperature of the battery cannot be prevented and a thermal contraction of the separator occurs, causing short circuiting of the battery.

As is clear from FIG. 2, however, in the case where lithium manganese oxide is included in the active material of the positive electrode, it is found that the level of overcharging of the battery increases when the separator A is used in comparison with a case where the separator X is used even if the ratio of lithium cobalt oxide in the active material of the positive electrode is 90 wt. % or higher.

Here, in the case of the utilization of an active material of the positive electrode in which lithium cobalt oxide in a range of from 0 wt. % to 50 wt. % is mixed, the levels of overcharging of batteries a0 to a5 as well as x0 to x5 are all 5 C or higher, and there was no confirmation of any significant difference. Accordingly, in Experiment 3, effectiveness of the separator A was observed in a battery using an active material of the positive electrode that contains lithium manganese oxide in the case where lithium cobalt oxide in a range of from 50 wt. % to 100 wt. % is mixed in the active material of the positive electrode.

Experiment 4

In Experiment 4, the active materials of the positive electrode, where no significant differences of the levels of overcharging of the battery have been confirmed in Experiment 3 and in which lithium cobalt oxide of 0 wt. % to 50 wt. % is mixed, are utilized to fabricate non-aqueous electrolyte batteries of 1500 mAh. Thus, the interrelationship between the ratio of lithium cobalt oxide in the active material of the positive electrode and the level of overcharging of the battery is examined.

[Manufacture of Battery]

Active materials of the positive electrode gained by mixing lithium cobalt oxide ($LiCoO_2$) and lithium manganese oxide ($LiMn_2O_4$) so that the ratio of lithium cobalt oxide became 0 wt. %, 10 wt. %, 20 wt. %, 30 wt. %, 40 wt. % and 50 wt. % were utilized while separators A and X were used and, thereby, non-aqueous electrolyte batteries A0 to A5 as well as X0 to X5 (of which the capacities are 1500 mAh) were fabricated as shown in Table 3. Thus, the non-aqueous electrolyte batteries were manufactured with the other conditions being the same as in Experiment 2.

[Overcharging Test]

Figure 5:
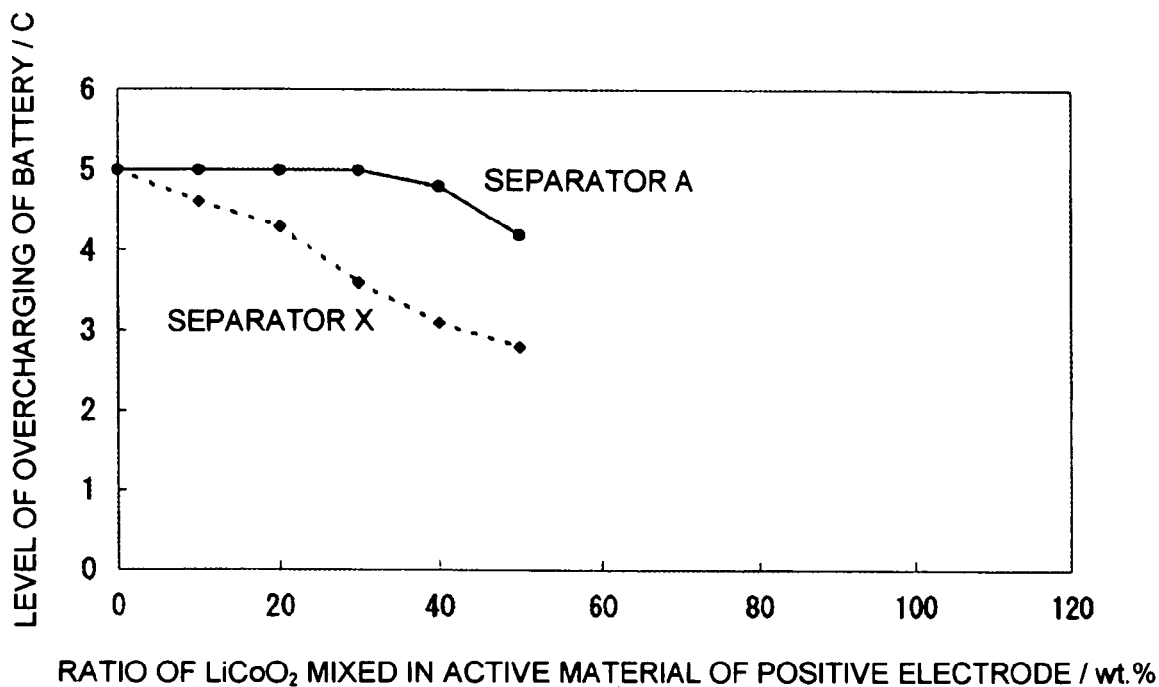
FIG. 5 is a graph showing the interrelationship between the wt. % of lithium cobalt oxide in the active material of the positive electrode and the level of overcharging in a battery of a 1500 mAh class.

Occurrence of short circuiting was confirmed in the same manner as in Experiment 2 except for the examination of overcharging current of 1 C (1450 mA) to 5 C (7250 mA). Thus, the maximum current value that has not caused short circuiting was found as the level of overcharging of each battery and then the results thereof were shown in FIG. 5 and in Table 3. FIG. 5 is a graph showing the interrelationship between the wt. % of lithium cobalt oxide in the active material of the positive electrode and the level of overcharging of the battery. Here, the overcharging test was carried out in a condition where no protection terminals or no protection elements were attached to the tested batteries.

TABLE 3

| Ratio of Lithium Cobalt Oxide Mixed in Active Material of Positive Electrode (wt. %) | Level of Overcharging of Battery | |
|---|---|---|
| | Separator A | Separator X |
| 0 | 5.0 C (Battery A0) | 5.0 C (Battery X0) |
| 10 | 5.0 C (Battery A1) | 4.6 C (Battery X1) |
| 20 | 5.0 C (Battery A2) | 4.3 C (Battery X2) |
| 30 | 5.0 C (Battery A3) | 3.6 C (Battery X3) |
| 40 | 4.8 C (Battery A4) | 3.1 C (Battery X4) |
| 50 | 4.2 C (Battery A5) | 2.8 C (Battery X5) |

As is clear from FIG. 5 and Table 3 in the case where an active material of the positive electrode gained by mixing 20 wt. % of lithium cobalt oxide in the active material of the positive electrode is utilized, it is found that the level of overcharging of the battery A2 (of which the level of overcharging is 5 C) has increased in comparison with a battery X2 (of which the level of overcharging is 4.3 C). In addition, in the case where an active material of the positive electrode gained by mixing 10 wt. % to 15 wt. % of lithium cobalt oxide is mixed in the active material of the positive electrode is utilized, it is also found that the levels of overcharging of batteries A1 to A5 which utilize separators A have respectively increased in comparison with batteries X1 to X5 which use the separator X gained by utilizing an active material of the positive electrode having the same ratio of mixture.

Here, in the case where a battery having a capacity as high as 1500 mAh is overcharged, a balance between heat generated in the battery and heat released to the outside of the battery is lost when the battery is overcharged and the heat dissipation of the battery is lowered in comparison with a battery having a low capacity. In Experiment 4, batteries having a capacity as high as 1500 mAh are used and the temperature inside of a battery having a high capacity easily rises, and therefore, it is considered that more battery short circuiting prevention effects are gained by using the separator A which has a small area contraction ratio (11%) at 120° C.

In addition, the levels of overcharging of non-aqueous electrolyte batteries A0 and X0 of which the active materials of the positive electrodes are made solely of lithium manganese oxide were both 5 C or higher. In the case where a battery having a higher capacity is manufactured, or in the case where the overcharging test is carried out by making the current value greater than 5 C, it is expected from FIG. 5 that the level of overcharging of a battery using the separator A with an area contraction ratio of 11% increases in comparison with the case where the separator X with an area contraction ratio of 30% is used.

As a result, in Experiment 4 an effectiveness of the separator A was observed in a battery that uses an active material of the positive electrode containing lithium manganese oxide in the case where lithium cobalt oxide in a range of from 0 wt. % to 50 wt. % is mixed in the active material of the positive electrode.

In addition, it was found from the results of Experiments 3 and 4 that effectiveness of an increased level of overcharging of the battery using the separator A is particularly great at the time when the ratio of lithium cobalt oxide in the active material of the positive electrode is 10 wt. % to 90 wt. %.

Experiment 5

In Experiment 5, the level of overcharging of the battery was examined using a lithium-nickel complex oxide, where a portion of nickel is replaced with cobalt, in place of lithium cobalt oxide as the active material of the positive electrode.

$LiNi_{0.8}Co_{0.2}O_2$ (lithium-nickel complex oxide), where a portion of nickel was replaced with cobalt, was used in place of lithium cobalt oxide as the active material of the positive electrode and an active material of the positive electrode, of which the ratio of $LiNi_{0.8}Co_{0.2}O_2$ in the active material of the positive electrode was 80 wt. %, was utilized when respective batteries ($a_N8$, $X_N8$) were manufactured using the separators A and X. Thus, an overcharging experiment was carried out with the other conditions being the same manner as in Experiment 2. The results thereof are shown in Table 4.

TABLE 4

| Ratio of Lithium-Nickel Complex Oxide Mixed in Active Material of Positive Electrode (wt. %) | Level of Overcharging of Battery | |
|---|---|---|
| | Separator A | Separator X |
| 80 | 4.0 C (Battery $a_N8$) | 1.7 C (Battery $x_N8$) |

As is clear from Table 4, it is found that the level of overcharging of a battery $a_N8$ using the separator A has increased in comparison with a battery $x_N8$ using the separator X even in the case where lithium-nickel complex oxide is utilized in place of lithium cobalt oxide as the active material of the positive electrode.

This is because the depositing of lithium on the surface of the negative electrode is restricted by including lithium manganese oxide in the active material of the positive electrode, and the thermal stability of the positive electrode in a highly oxidized condition is maintained so as to prevent a sudden temperature rise in the battery in the case where lithium-nickel complex oxide is utilized in place of lithium cobalt oxide as the active material of the positive electrode. Furthermore, it is considered that the thermal contraction of the separator A can be prevented while the shut-down function of the separator A is taking place. On the other hand, it is considered that the battery $x_N8$ utilizing the separator X is short circuited as a result of occurrence of the thermal contraction of the separator X while the shut-down function of the separator X is taking place.

Preparatory Experiment

In this preparatory experiment, the film-breaking temperature and the shut-down temperature of each separator were measured when the temperature rises at 2° C./min and at 15° C./min.

[Measurement of Film-breaking Temperature and Shut-down Temperature of Separator]

Figure 6:
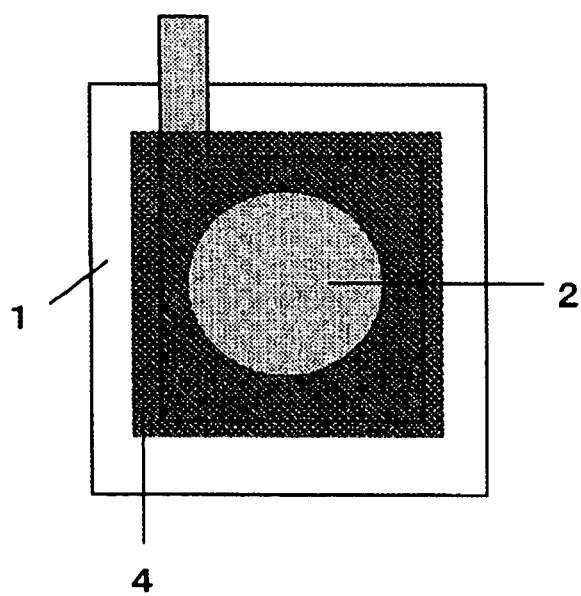
FIG. 6 is a schematic view showing the condition of a glass plate to which a copper foil is adhered with an imide tape and which is used in a cell for measuring the film-breaking temperature and the shut-down temperature according to the present invention.

$LiBF_4$ was dissolved in γ-butyrolactone to be at a ratio of 1.0 mol/l, to which 1 wt. % of F-142P (σ=3.33 mS/cm) was added as a surface active agent, and thereby, electrolyte (non-aqueous electrolyte) was prepared. This electrolyte was impregnated into separators A', B' (gained by cross-linking a separator Y' with an electron beam), X', Y' and Z' at a reduced pressure of ⅓ atmospheric pressure for 5 minutes and this process was repeated 4 times so that the electrolyte was impregnated into the separators A' and X'. Next, as shown in FIG. 6, copper foil 2 (of which the thickness is 16.5 μm) was attached to glass plate 1 using heat resistant imide tape 4 (of which the thickness is 80 μm) with a hole having a diameter of 17.8 mm created in the center portion, and then, the prepared electrolyte was placed thereon.

Figure 7:
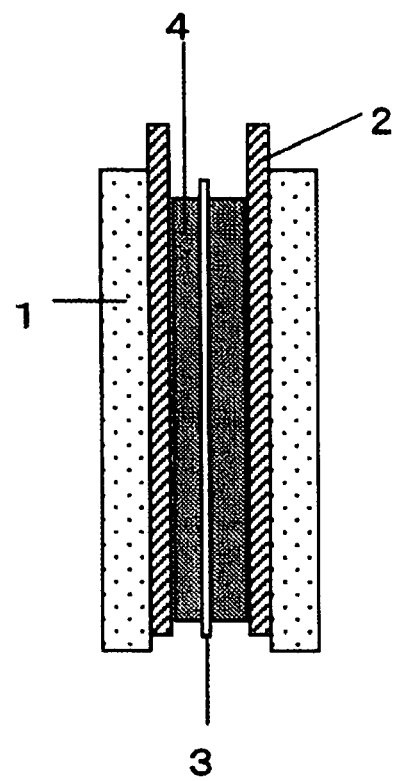
FIG. 7 is a cross sectional view of a cell for measuring the film-breaking temperature and the shut-down temperature according to the present invention.

Then, as shown in FIG. 7, each separator 3 was sandwiched with glass plates to which copper foils were attached while preventing the mixture of air bubbles, and this was fixed with clips so as to fabricate a cell to be measured. The heat resistant imide tape was utilized in order to prevent short circuiting of the separator due to burr on the edge portions of the electrodes.

Next, the above fabricated cells to be measured were heated in a heating bath at rising temperature rates of 15° C./min and 2° C./min while the impedances of the cells were measured at a measuring frequency of 10 kHz using an LCR high tester, HIOKI3522 made by HIOKI E. E. CORPORATION. The results at the time where the rising temperature rate is 15° C./min are shown in FIG. 8.

Figure 8:
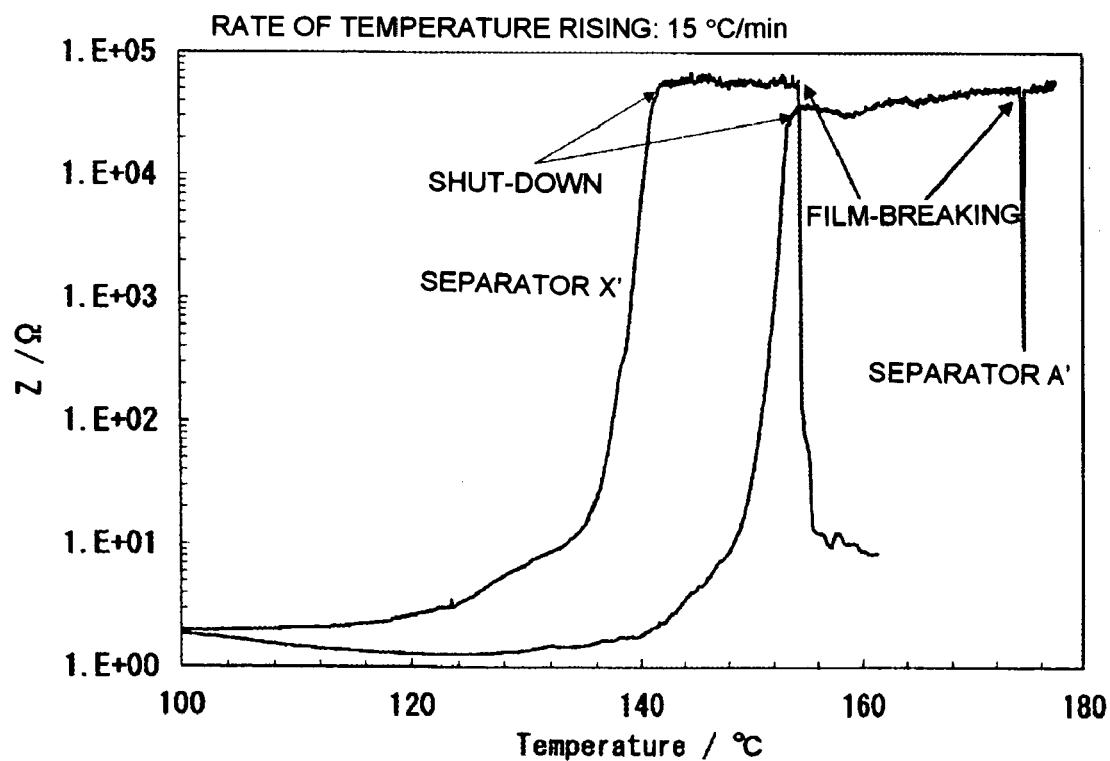
FIG. 8 is a graph showing the results of measurements of the film-breaking temperature and the shut-down temperature according to the impedance method.

In FIG. 8, the points where the resistance values (Z/Ω) of the separators change can be regarded as the points where the shut-down functions of the separators have taken place, and in addition, the points where the resistance values suddenly drop can be regarded as the point of film-breaking. The shut-down temperatures and the film-breaking temperatures of the respective separators at the respective rising temperature rates, which have been found in a manner as described above, are shown in Table 5.

4.5 V so as to carry out the above described measurement, it is considered that the temperature at which heat is generated on the positive electrode exceeds 162° C.

Therefore, the shut-down function of the separator utilized in the present invention must take place at 162° C. or lower where the thermal stability of the charged positive electrode can be secured. Even when the difference between the film-breaking temperature and the shut-down temperature is 20° C. or higher at the time when temperature rises at 15° C./min, there is a possibility of an abnormal temperature increase inside the battery due to heat generated on the positive electrode before the shut-down function takes place in the case where a separator of which the shut-down temperature is higher than 162° C. is utilized.

Experiment 7

In Experiment 7, separators having different differences between the film-breaking temperature and the shut-down temperature at the time when temperature rises at 15° C./min were used so that the interrelationships between the separator and the level of overcharging of the battery were examined.

TABLE 5

| Separator | Rising Temperature Rate of 2° C./min | | | Rising Temperature Rate of 15° C./min | | |
|---|---|---|---|---|---|---|
| | Shut-Down Temp./° C. | Film-Breaking Temp./° C. | Difference in Temp./° C. | Shut-Down Temp./° C. | Film-Breaking Temp./° C. | Difference in Temp./° C. |
| A' | 147 | 174 | 27 | 154 | 174 | 20 |
| B' | 136 | >175 | >30 | 145 | 175 | >30 |
| X' | 129 | 152 | 23 | 142 | 154 | 12 |
| Y' | 137 | 145 | 8 | 146 | 150 | 4 |
| Z' | 138 | 155 | 17 | 150 | 153 | 3 |

As seen in Table 5, the separators A' and B' have a difference between the film-breaking temperature and the shut-down temperature of 20° C. or higher while the separators X', Y' and Z' have a difference between the film-breaking temperature and the shut-down temperature of 12° C. or lower.

Experiment 6

In Experiment 6, lithium cobalt oxide is used as the active material of the positive electrode and the thermal stability of the active material of the positive electrode was examined.

$LiCoO_2$ that had been charged up to 4.3 V and 4.5 V using Li metal as the reference electrode was washed with diethyl carbonate and after that, vacuum drying was carried out for 30 minutes. 3 mg of this mixture of the positive electrode was further mixed with 2 mg of ethylene carbonate and was sealed in aluminum foil and thus the temperature at which the positive electrode starts generating heat was measured using a DSC unit at a temperature rising rate of 5° C./min.

As a result, it was found that $LiCoO_2$ charged up to 4.3 V starts generating heat at 202° C. and $LiCoO_2$ charged up to 4.5 V starts generating heat at 162° C.

The thermal stability of lithium cobalt oxide measured herein is low in comparison with lithium manganese oxide. Accordingly, in the case wherein an active material of the positive electrode made of a mixture of lithium cobalt oxide and lithium manganese oxide or a mixture of a lithium-nickel complex oxide and lithium manganese oxide is charged up to

[Manufacture of Positive Electrode]

Lithium cobalt oxide ($LiCoO_2$) and lithium manganese oxide ($LiMn_2O_4$) were mixed so that lithium cobalt oxide becomes 80 wt. % and thereby an active material of the positive electrode was prepared. This active material of the positive electrode, carbon conductive agent (artificial graphite SP300) and graphite (acetylene black) were mixed at a weight ratio of 92:3:2 and, thereby a mixture powder of the positive electrode was prepared. 200 g of this mixture powder of the positive electrode was filled into a mixing unit (Mechano fusion unit (AM-15F) made by Hosokawa Micron Corporation) and after that the mixing unit was operated for ten minutes at a revolution of 1500 rpm so that mixture was carried out due to compression, impact and shearing effects so as to gain a mixture that was an active material of the positive electrode. Next, a fluorine based resin bonding agent (PVDF (polyvinylidene fluoride)) was added to the mixture that was the active material of the positive electrode so that the weight ratio of the mixture that was the active material of the positive electrode to the fluorine based resin bonding agent became 97:3 and after that, this mixture was kneaded in an NMP solvent (N-methyl-2-pyrolidone) so as to gain a mixture of slurry of the positive electrode. This mixture of slurry of the positive electrode was applied to both surfaces of an aluminum foil and was dried and after that, the aluminum foil was rolled so that a positive electrode in plate form was prepared.

[Manufacture of Negative Electrode]

A mixture gained by mixing a carbon material (graphite) which is an active material of the negative electrode with SBR (styrene-butadiene rubber) according to a weight ratio of 98:2 was applied to both surfaces of a copper foil and was dried, and after that, the copper foil was rolled to prepare a negative electrode in plate form.

[Preparation of Electrolyte Solution]

$LiPF_6$ which is a solute was dissolved in a solvent, gained by mixing ethylene carbonate with diethyl carbonate according to a volume ratio of 3:7, at a rate of 1.0 mol/l and, thereby, an electrolyte was prepared.

[Manufacture of Non-aqueous Electrolyte Battery]

As shown in FIG. 1, a positive electrode, a negative electrode, electrolyte and separators gained in the above described manners were used and lead terminals were attached to the positive electrode 11 and the negative electrode 12, respectively, and a separator 3 was placed between the positive and negative electrodes. Furthermore, another separator was placed on the positive electrode and after that, the positive electrode was wound in spiral form. This winding in spiral form was placed in the exterior body of the battery made of aluminum laminate and after that, the electrolyte solution was injected and the exterior body of the battery was sealed so that a thin non-aqueous electrolyte battery, such as thin non-aqueous electrolyte batteries a'8, b'8, x'8, y'8 or Z'8 (of which the capacity is 700 mAh), was manufactured as shown in Table 6.

[Overcharging Tests]

Each of the batteries that had been manufactured was discharged down to 2.75V with a predetermined discharge current (constant current). After that, each battery was charged to 12V with a predetermined charge current (constant current) and then, was overcharged using a circuit for allowing charge at a constant voltage and this process was continued until 3 hours had passed since the point of time when the current was cut off for the first time. Then, the existence of short circuiting was confirmed. The examination was carried out with overcharging current of 1 C (650mA) to 5 C (3250mA). Thus, the maximum current value that does not cause short circuiting was gained for each battery and this result is shown in Table 6 as a level of over charging of the battery. Here, this overcharging test is carried out in the condition where no protection terminals or no protection elements are attached to the tested batteries. In addition, a separator B' was gained by carrying out a cross-linking process on the separator Y' by means of an electron beam.

TABLE 6

| | Separator | | | | |
|---|---|---|---|---|---|
| | A' | B' | X' | Y' | Z' |
| Shut-Down Temp./° C. at the Time When Temp. Rises at 15° C./min | 154 | 145 | 142 | 146 | 150 |
| Film-Breaking Temp./° C. at the Time When Temp. Rises at 15° C./min | 174 | >175 | 154 | 150 | 153 |
| Difference Between Film-Breaking Temp. and Shut-Down Temp./° C. at the Time When Temp. Rises at 15° C./min | 20 | >30 | 12 | 4 | 3 |

TABLE 6-continued

| | Separator | | | | |
|---|---|---|---|---|---|
| | A' | B' | X' | Y' | Z' |
| Level of Overcharging of Battery | 4.6 C (Battery a'8) | 4.8 C (Battery b'8) | 1.8 C (Battery x'8) | 1.7 C (Battery y'8) | 1.7 C (Battery z'8) |

As is clear from Table 6, the levels of overcharging of batteries a'8 and b'8 have increased in comparison with the batteries x'8, y'8 and z'8.

In addition, as shown in the above Table 5, the temperature difference between the film-breaking temperature and the shut-down temperature of a separator X' at the time when temperature rises at 2° C./min is 20° C. or greater (23° C.). At the time of overcharging test, however, it is considered that the temperature rising rate inside the battery becomes 15° C./min or greater. In addition, the heat generating reaction inside the battery does not completely finish immediately after the shut-down function takes place. Accordingly, it is considered that in the battery x'8 that uses the separator X' of which the temperature difference at the time when the temperature rising rate is 15° C./min is 20° C. or less (12° C.), the separator easily reaches to the film-breaking temperature due to the heat generating reaction inside the battery while the shut-down function is taking place or immediately after the shut-down function has taken place. As a result, it is considered that the separator is broken so as to short circuit the battery.

On the other hand, heat generating reaction occurs inside the battery a'8 using a separator A' after the shut-down function of the separator takes place where the difference between the shut-down temperature and the film-breaking temperature is 20° C. or higher, and therefore it is considered possible to prevent the film-breaking of the separator.

Accordingly, when the difference between the film-breaking temperature and the shut-down temperature at the time when the temperature of the separator rises at 15° C./min is 20° C. or greater, it is found that the battery can be prevented from being short circuited due to the film-breaking of the separator even in the case where a sudden temperature rise occurs after the shut-down function of the separator takes place during the time of overcharging. In particular, in the case of a non-aqueous electrolyte battery where the positive electrode, the negative electrode and the separator are firmly held as flat wound electrodes, it is considered that the effects of preventing film-breaking are great even if the separator is in a condition of being stretched as a result of winding.

In addition, the level of overcharge of a battery b'8 using the separator B' was 4.8 C which is the highest. This is because a separator B' is gained by carrying out a cross-linking process on the separator Y' and thereby is considered to have a strong bonding force between molecules. As a result, only the film-breaking temperature can be risen while the shut-down temperature is maintained the same so as to make the difference between the film-breaking temperature and the shut-down temperature become 30° C. or higher and thus it is considered that the level of overcharging of the battery was increased.

As a result of the above described preparatory experiment, Experiment 6 and Experiment 7, in a non-aqueous electrolyte battery having a positive electrode, a negative electrode, non-aqueous electrolyte and a separator, it is necessary for the active material of the positive electrode to include lithium manganese oxide; it is necessary for the shut-down temperature of the separator to be 162° C. or lower; and it is necessary to make the difference between the film-breaking temperature and the shut-down temperature become 20° C. or higher at the time when the temperature rises at 15° C./min.

Experiment 8

Figure 9:
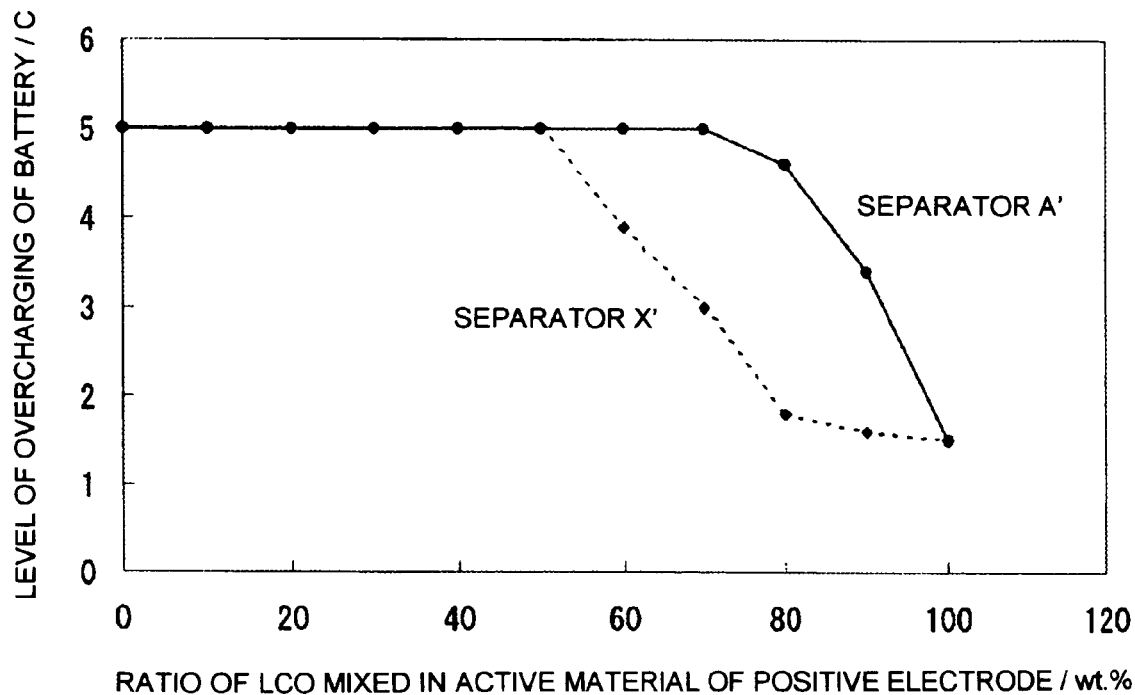
FIG. 9 is a graph showing the interrelationship between the wt. % of lithium cobalt oxide in the active material of the positive electrode and the level of overcharging in a battery of a 700 mAh class.

In Experiment 8, separators A' and X' were used to examine the interrelationship between the ratio of lithium cobalt oxide in the active material of the positive electrode, which were varied, and the level of overcharging of the material, Lithium cobalt oxide ($LiCoO_2$) and lithium manganese oxide ($LiMn_2O_4$) were mixed so that the ratio of lithium cobalt oxide became 0 wt. %, 10 wt. %, 20 wt. %, 30 wt. %, 40 wt. %, 50 wt. %, 60 wt. %, 70 wt. %, 80 wt. %, 90 wt. % and 100 wt. % and, thereby, eleven types of active materials of the positive electrode having different ratios of mixture were prepared while separators A' and X' were used so that batteries a'0 to a'10 as well as x'0 to x'10 were fabricated as shown in Table 7. Thus, an overcharging test was carried out with the other conditions being the same manner as in Experiment 7. The interrelationship between the area contraction ratio at 120° C. and the level of overcharging of the battery is shown in FIG. 9 and Table 7. FIG. 9 is a graph showing the interrelationship between the wt. % of lithium cobalt oxide in the active material of the positive electrode and the level of overcharging of the battery.

TABLE 7

| Ratio of Lithium Cobalt Oxide Mixed in Active Material of Positive Electrode (wt. %) | Level of Overcharging of Battery | |
|---|---|---|
| | Separator A' | Separator X' |
| 0 | 5.0 C (Battery a'0) | 5.0 C (Battery x'0) |
| 10 | 5.0 C (Battery a'1) | 5.0 C (Battery x'1) |
| 20 | 5.0 C (Battery a'2) | 5.0 C (Battery x'2) |
| 30 | 5.0 C (Battery a'3) | 5.0 C (Battery x'3) |
| 40 | 5.0 C (Battery a'4) | 5.0 C (Battery x'4) |
| 50 | 5.0 C (Battery a'5) | 5.0 C (Battery x'5) |
| 60 | 5.0 C (Battery a'6) | 3.9 C (Battery x'6) |
| 70 | 5.0 C (Battery a'7) | 3.0 C (Battery x'7) |
| 80 | 4.6 C (Battery a'8) | 1.8 C (Battery x'8) |
| 90 | 3.4 C (Battery a'9) | 1.6 C (Battery x'9) |
| 100 | 1.5 C (Battery a'10) | 1.5 C (Battery x'10) |

As is clear from FIG. 9 and Table 7, it is found that the level of overcharging of a battery a'8 (of which the level of overcharging is 4.6 C) has been increased in comparison with a battery x'8 (of which the level of overcharging is 2.0 C) in the case wherein an active material of the positive electrode in which 80 wt. % of lithium cobalt oxide has been mixed is utlilized.

Figure 10:
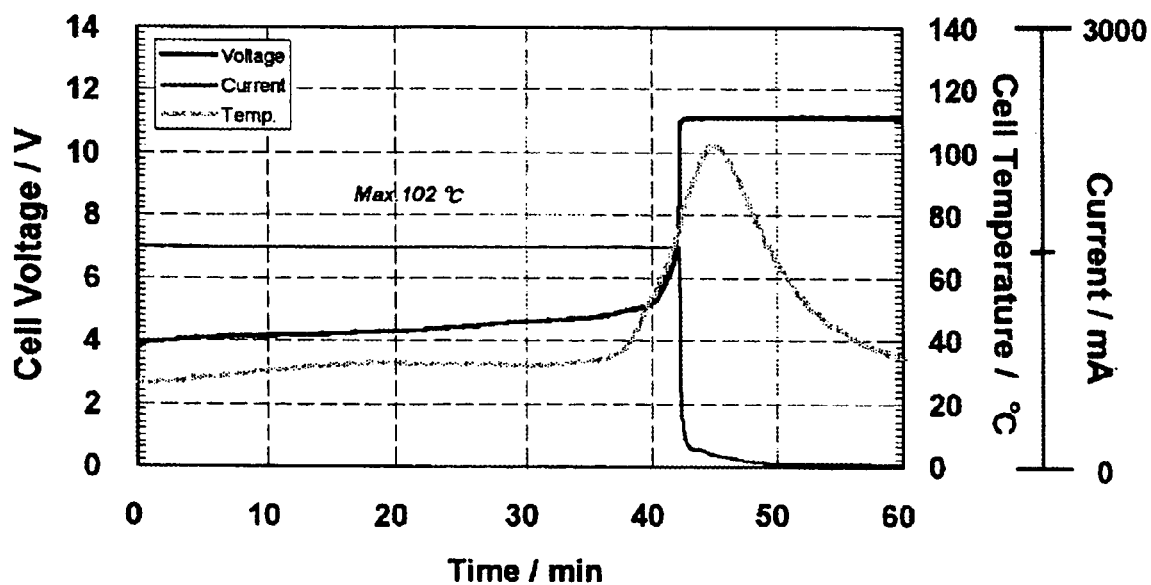
FIG. 10 is a graph showing the overcharging characteristics of a battery a'8.
Figure 11:
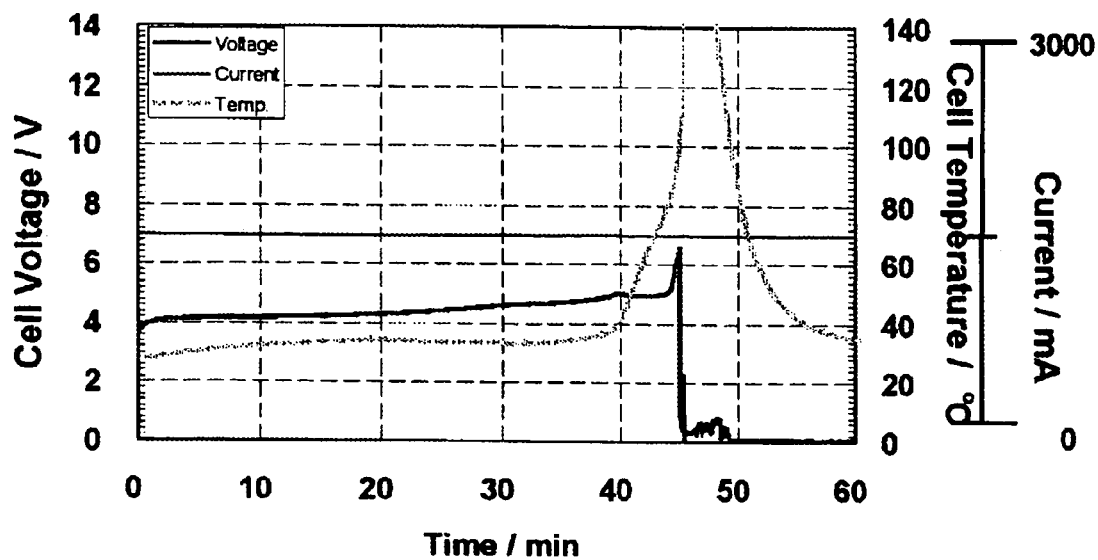
FIG. 11 is a graph showing the overcharging characteristics of a battery x'8.

In order to understand the reason why the level of overcharging of the battery has increased, the graph of FIG. 10 shows the overcharging characteristics of the battery a'8 while the graph of FIG. 11 shows the overcharging characteristics of the battery x'8 at the time when tests are carried out with a current value of 2 C.

The battery a'8 includes lithium manganese oxide in an active material of the positive electrode and, thereby, lithium depositing on the surface of the negative electrode is restricted and in addition, the thermal stability of the positive electrode is maintained in a highly oxidized condition and, thereby, a sudden rise in temperature of the battery is prevented. Furthermore, it is considered that the separator A' is utlilized in order to prevent the contraction of the separator A' while the shut-down function is taking place. In particular, the battery a'8 has a structure where the positive electrode, the negative electrode and the separator are firmly held in the form of flat wound electrodes and, therefore, the separator can be prevented from breaking due to the contraction because of the area contraction ratio of the separator at 120° C. being 15% or less even in the case wherein the separator is in a taut state due to winding.

On the other hand, it is considered that a thermal contraction of the separator X' has occurred while the shut-down function of the separator X' is taking place and, thereby, short circuiting between the positive and negative electrodes has occurred in the battery x'8 though a sudden rise in temperature is prevented as a result of the existence of lithium manganese oxide in an active material of the positive electrode.

In addition, the ratio of lithium cobalt oxide mixed in the active material of the positive electrode should be noted. In the case of the utilization of an active material of the positive electrode in which lithium cobalt oxide in a range of from 60 wt. % to 90 wt. % is mixed, it is found that the levels of overcharging of batteries a'6 to a'9, respectively, which utilize the separator A', have increased in comparison with batteries x'6 to x'9 that utilize the active materials of the positive electrode having the same ratios of mixture and that uses the separator X'.

Here, the levels of overcharging of batteries a'10 and x'10, where the active materials of the positive electrode are solely made of lithium cobalt oxide, are both 1.5C and thus, an increase in the level of overcharging of the battery by using the separator A' was not recognized.

This is because the batteries a'10 and x'10 do not include lithium manganese oxide in the active materials of the positive electrode and, therefore, lithium easily deposits on the surface of the negative electrodes and the positive electrodes in a highly oxidized condition easily become thermally unstable. As a result, it is considered that a sudden rise in temperature of the battery cannot be prevented and a thermal contraction of the separator occurs, causing short circuiting of the battery.

As is clear from FIG. 9, however, in the case where lithium manganese oxide is included in the active material of the positive electrode, it is found that the level of overcharging of the battery increases when the separator A' is used in comparison with a case where the separator X' is used even if the ratio of lithium cobalt oxide in the active material of the positive electrode is 90 wt. % or higher.

Here, in the case of the utilization of an active material of the positive electrode in which lithium cobalt oxide in a range of from 0 wt. % to 50 wt. % is mixed, the levels of overcharging of batteries a'0 to a'5 as well as x'0 to x'5 are all 5C or higher, and there was no confirmation of any significant difference. Accordingly, in Experiment 8, effectiveness of the separator A' was observed in a battery using an active material of the positive electrode that contains lithium manganese oxide in the case where lithium cobalt oxide in a range of from 50 wt. % to 100 wt. % is mixed in the active material of the positive electrode.

Experiment 9

In Experiment 9, the active materials of the positive electrode, where no significant differences of the levels of overcharging of the battery have been confirmed in Experiment 8 and in which lithium cobalt oxide of 0 wt. % to 50 wt. % is mixed, are utilized to fabricate non-aqueous electrolyte batteries of 1500 mAh. Thus, the interrelationship between the ratio of lithium cobalt oxide in the active material of the positive electrode and the level of overcharging of the battery is examined.

[Manufacture of Battery]

Active materials of the positive electrode gained by mixing lithium cobalt oxide ($LiCoO_2$) and lithium manganese oxide ($LiMn_2O_4$) so that the ratio of lithium cobalt oxide became 0 wt. %, 10 wt. %, 20 wt. %, 30 wt. %, 40 wt. % and 50 wt. % were utilized while separators A' and X' were used and, thereby, non-aqueous electrolyte batteries A'0 to A'5 as well as X'0 to X'5 (of which the capacities are 1500 mAh) were fabricated as shown in Table 8. Thus, the non-aqueous electrolyte batteries were manufactured with the other conditions being the same as in Experiment 7.

[Overcharging Test]

Figure 12:
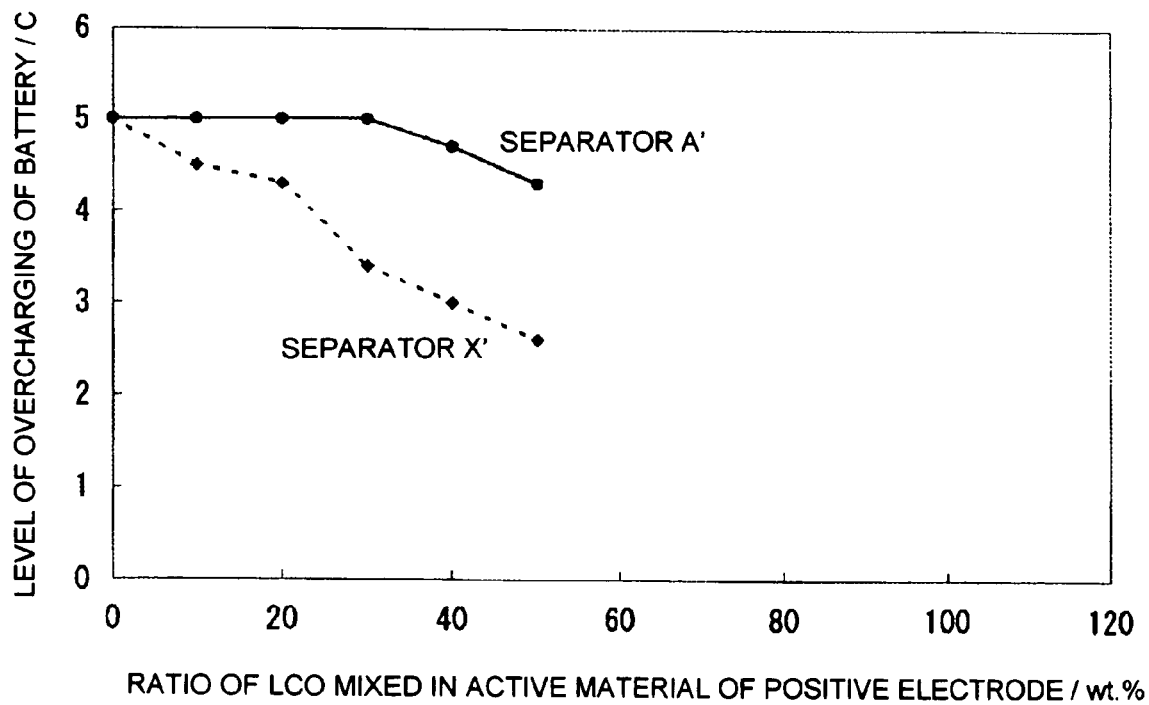
FIG. 12 is a graph showing the interrelationship between the wt. % of lithium cobalt oxide in the active material of the positive electrode and the level of overcharging in a battery of a 1500 mAh class.

Occurrence of short circuiting was confirmed in the same manner as in Experiment 7 except for the examination of overcharging current of 1C (1450 mA) to 5C (7250 mA). Thus, the maximum current value that has not caused short circuiting was found as the level of overcharging of each battery and then the results thereof were shown in FIG. 12 and in Table 8. FIG. 12 is a graph showing the interrelationship between the wt. % of lithium cobalt oxide in the active material of the positive electrode and the level of overcharging of the battery. Here, the overcharging test was carried out in a condition where no protection terminals or no protection elements were attached to the tested batteries.

TABLE 8

| Ratio of Lithium Cobalt Oxide Mixed in Active Material of Positive Electrode (wt. %) | Level of Overcharging of Battery | |
|---|---|---|
| | Separator A' | Separator X' |
| 0 | 5.0 C (Battery A'0) | 5.0 C (Battery X'0) |
| 10 | 5.0 C (Battery A'1) | 4.5 C (Battery X'1) |
| 20 | 5.0 C (Battery A'2) | 4.3 C (Battery X'2) |
| 30 | 5.0 C (Battery A'3) | 3.4 C (Battery X'3) |
| 40 | 4.7 C (Battery A'4) | 3.0 C (Battery X'4) |
| 50 | 4.3 C (Battery A'5) | 2.6 C (Battery X'5) |

As is clear from FIG. 12 and Table 8 in the case where an active material of the positive electrode gained by mixing 20 wt. % of lithium cobalt oxide in the active material of the positive electrode is utilized, it is found that the level of overcharging of the battery A'2 (of which the level of overcharging is 5 C) has increased in comparison with a battery X'2 (of which the level of overcharging is 4.3 C). In addition, in the case where an active material of the positive electrode gained by mixing 10 wt. % to 15 wt. % of lithium cobalt oxide is mixed in the active material of the positive electrode is utilized, it is also found that the levels of overcharging of batteries A'1 to A'5 which utilize separators A' have respectively increased in comparison with batteries X'1 to X'5 which use the separator X' gained by utilizing an active material of the positive electrode having the same ratio of mixture.

Here, in the case where a battery having a capacity as high as 1500 mAh is overcharged, a balance between heat generated in the battery and heat released to the outside of the battery is lost when the battery is overcharged and the heat dissipation of the battery is lowered in comparison with a battery having a low capacity. In Experiment 9, batteries having a capacity as high as 1500 mAh are used and the temperature inside of a battery having a high capacity easily rises, and therefore, it is considered that more battery short circuiting prevention effects are gained by using the separator A' in which the difference between the film-breaking temperature and the shut-down temperature at the time when the temperature rises at 15° C./min is 20° C.

In addition, the levels of overcharging of non-aqueous electrolyte batteries A'0 and X'0 of which the active materials of the positive electrodes are made solely of lithium manganese oxide were both 5 C or higher. In the case where a battery having a higher capacity is manufactured, or in the case where the overcharging test is carried out by making the current value greater than 5 C, it is expected from FIG. 12 that the level of overcharging of a battery using the separator A' in which the difference between the film-breaking temperature and the shut-down temperature at the time when the temperature rises at 15° C./min is 20° C. increases, in comparison with the case where the separator X' in which the difference between the film-breaking temperature and the shut-down temperature at the time when the temperature rises at 15° C./min is 12° C. is used.

As a result, in Experiment 9 an effectiveness of the separator A' was observed in a battery that uses an active material of the positive electrode containing lithium manganese oxide in the case where lithium cobalt oxide in a range of from 0 wt. % to 50 wt. % is mixed in the active material of the positive electrode.

In addition, it was found from the results of Experiments 8 and 9 that effectiveness of an increased level of overcharging of the battery using the separator A' is particularly great at the time when the ratio of lithium cobalt oxide in the active material of the positive electrode is 10 wt. % to 90 wt. %.

Experiment 10

In Experiment 10, the level of overcharging of the battery was examined using a lithium-nickel complex oxide, where a portion of nickel is replaced with cobalt, in place of lithium cobalt oxide as the active material of the positive electrode.

$LiNi_{0.8}Co_{0.2}O_2$ (lithium-nickel complex oxide), where a portion of nickel was replaced with cobalt, was used in place of lithium cobalt oxide as the active material of the positive electrode and an active material of the positive electrode, of which the ratio of $LiNi_{0.8}Co_{0.2}O_2$ in the active material of the positive electrode was 80 wt. %, was utilized when respective batteries ($a'_N8$, $x'_N8$) were manufactured using the separators A' and X'. Thus, an overcharging experiment was carried out with the other conditions being the same manner as in Experiment 6. The results thereof are shown in Table 9.

TABLE 9

| Ratio of Lithium-Nickel Complex Oxide Mixed in Active Material of Positive Electrode (wt. %) | Level of Overcharging of Battery | |
|---|---|---|
| | Separator A' | Separator X' |
| 80 | 4.1 C (Battery $a'_N8$) | 1.7 C (Battery $x'_N8$) |

As is clear from Table 9, it is found that the level of overcharging of a battery $a'_N8$ using the separator A' has increased in comparison with a battery $x'_N8$ using the separator X' even in the case where lithium-nickel complex oxide is utilized in place of lithium cobalt oxide as the active material of the positive electrode.

This is because the depositing of lithium on the surface of the negative electrode is restricted by including lithium manganese oxide in the active material of the positive electrode, and the thermal stability of the positive electrode in a highly oxidized condition is maintained so as to prevent a sudden temperature rise in the battery in the case where lithium-nickel complex oxide is utilized in place of lithium cobalt oxide as the active material of the positive electrode. Furthermore, it is considered that the thermal contraction of the separator A' can be prevented while the shut-down function of the separator A' is taking place. On the other hand, it is considered that the battery $x'_N8$ utilizing the separator x' is short circuited as a result of occurrence of the thermal contraction of the separator X' while the shut-down function of the separator X' is taking place.

In addition, the above described experiments are illustrations concerning the present invention and are not limited. Though lithium cobalt oxide without any replacement of lithium was, for example, used as the active material of the positive electrode in the above described experiments, the present invention is not limited to this but rather a substance gained by adding, or replacing lithium with, a different type of element such as Zr, Ti, Sn, Mg, Al, Co, Mn, Nb, Ni or the like, to lithium cobalt oxide may be used as the active material. In addition, the lithium-nickel complex oxide used in Experiment 10 may be a lithium nickel oxide of which a portion of Ni is replaced with Co, Mn, Al, Zr, Sn, Mg, Nb, Ti or the like, or may be a compound in layered form such as $LiNi_xMn_yCo_zO_2$ (x+y+z=1, x>0, y>0), or the like.

In addition, though in each of the above described experiments a mixture of an active material of the positive electrode was once fabricated by means of a mixing process in a mixing unit and then the mixture was further mixed in an NMP solvent so as to gain a slurry, which is the mixture of the positive electrode, the present invention is not limited to this, but rather a slurry, which is the mixture of the positive electrode, may be gained by directly carrying out a mixing process in an NMP solvent without having a mixing process in a mixing unit.

In addition, though in each of the above described experiments a carbon material (graphite), which is a general material for the active material of the negative electrode, was used as the active material of the negative electrode, the present invention is not limited to this, but rather another material may be used as long as the material allows the insertion and removal of lithium ions. That is to say, the same effects can be gained by using graphite, corks, tin oxide, lithium metal, silicon and a mixture thereof as the active material of the negative electrode.

In addition, though in each of the above described experiments the present invention was applied to a non-aqueous electrolyte battery having flat wound electrodes using a battery exterior body formed of an aluminum laminate, the present invention is not limited to this, but rather the present invention is applicable to a non-aqueous electrolyte battery in other forms, such as a rectangular form using a battery exterior body formed of ion or aluminum, a cylindrical form utilizing wound electrodes in cylindrical forms, or the like. Furthermore, the size of the battery is not particularly limited.

In addition, though in each of the above described experiments $LiPF_6$ is used as the solute of the electrolyte, the present invention is not limited to this, but rather the same effects can be gained by using $LiClO_4$, $LiBF_4$, $LiN(SO_2CF_3)_2$, $LiN(SO_2C_2F_5)_2$, $LiPF_{6-x}(C_nF_{2n+})_x$ [wherein 1<x<6, n=1 or 2] or a mixture gained by mixing two or more types of compounds selected from the group that includes these compounds, as the solute of the electrolyte. Here, though the amount of such solute to be added is not particularly limited, it is desirable to add an amount of 0.2 mol to 1.5 mol per one liter of the solute.

In addition, though in each of the above described experiments a mixture of ethylene carbonate and diethyl carbonate is used as the solvent of the electrolyte, the present invention is not limited to this, but rather the same effects can be gained by using propylene carbonate, ethylene carbonate, butylene carbonate, γ-butyrolactone, dimethyl carbonate, ethyl-methyl carbonate or a mixture of two or more types of compounds selected from the group that includes these compounds, as the solvent. Here, though the mixture. ratio in the case where two types from among the above described compounds are mixed is not particularly limited, it is desired to have a mixture of a ratio of 10:90 to 40:60 taking into consideration the permeability of the electrolyte into the positive and negative electrodes, as well as the effects of the electrolyte to the battery characteristics. Furthermore, it is preferable to use a solvent gained by mixing a cyclic carbonate and a chain carbonate taking the effects to the battery characteristics into consideration.

In addition, though each of the above described experiments is described by citing an example of a liquid based battery, the present invention is not limited to this, but rather is applicable to a gel-based polymer battery. In the case wherein the present invention is applied to a gel-based polymer battery, a polyether-based solid polymer, a polycarbonate-based solid polymer, a polyacrylonitrile-based solid polymer, a copolymer gained by copolymerizing two or more types of compounds selected from the group that includes these compounds as well as a polymer gained by cross-linking two or more types of compounds selected from the group that includes these compounds can be used as the polymer material. Thus, a gel-based polymer battery can be fabricated by using solid electrolyte made in gel form by combining any of the above described polymer materials, a lithium salt and electrolyte.

What is claimed is:

1. A non-aqueous electrolyte battery comprising a positive electrode, a negative electrode, non-aqueous electrolyte and a separator,
wherein an active material of the positive electrode includes lithium manganese oxide; said separator comprises polypropylene or polyethylene; the shut-down temperature of said separator is 162° C. or less; and the area contraction ratio of said separator at 120° C. is 15% or less.

2. The non-aqueous electrolyte battery according to claim 1, wherein said active material of the positive electrode is a mixture of lithium manganese oxide and lithium cobalt oxide or a mixture of lithium manganese oxide and a lithium-nickel complex oxide.

3. The non-aqueous electrolyte battery according to claim 2, wherein the ratio of lithium cobalt oxide or the lithium-nickel complex oxide in said active material of the positive electrode is 10 wt. % to 90 wt. %.

4. The non-aqueous electrolyte battery according to claim 1, wherein said non-aqueous electrolyte battery has a capacity of 1500 mAb or higher.

5. A non-aqueous electrolyte battery having a positive electrode, a negative electrode, non-aqueous electrolyte and a separator,
wherein an active material of the positive electrode includes lithium manganese oxide; said separator comprises polypropylene or polyethylene; the shut-down temperature of said separator is 162° C. or lower; and the difference between the film-breaking temperature and the shut-down temperature is 20° C. or higher at the time when the temperature rises at 15° C./min. (wherein the film breaking temperature>the shut-down temperature).

6. The non-aqueous electrolyte battery according to claim 5, wherein said active material of the positive electrode is a mixture of lithium manganese oxide and lithium cobalt oxide or a mixture of lithium manganese oxide and a lithium-nickel complex oxide.

7. The non-aqueous electrolyte battery according to claim 6, wherein the ratio of lithium cobalt oxide, or of the lithium-nickel complex oxide, in said active material of the positive electrode is 10 wt. % to 90 wt. %.

8. The non-aqueous electrolyte battery according to claim 5, wherein said separator has a cross-linked structure.

9. The non-aqueous electrolyte battery according to claim 5, wherein said non-aqueous electrolyte battery has a capacity of 1500 mAh or higher.

* * * * *